United States Patent

Back

[11] Patent Number: 4,582,896
[45] Date of Patent: Apr. 15, 1986

[54] 1:2-METAL COMPLEX DYES CONTAINING ONE ATOM OF CHROMIUM OR COBALT AND TWO AZO DYES EACH FORMED BY COUPLING TWO DIAZO COMPOUNDS TO RESORCINOL

[75] Inventor: Gerhard Back, Lörrach, Fed. Rep. of Germany

[73] Assignee: Ciba-Geigy Corporation, Ardsley, N.Y.

[21] Appl. No.: 503,949

[22] Filed: Jun. 13, 1983

[30] Foreign Application Priority Data

Jun. 24, 1982 [CH] Switzerland .................. 3887/82

[51] Int. Cl.$^4$ ............... C09B 45/06; C09B 45/10; C09B 45/26; C09B 45/30
[52] U.S. Cl. ..................... 534/684; 534/573; 534/683; 534/688; 534/696; 534/699
[58] Field of Search ............ 260/145 A, 145 C, 149; 534/684

[56] References Cited

U.S. PATENT DOCUMENTS

| | | | |
|---|---|---|---|
| 2,200,445 | 5/1940 | Fellmer | 260/145 |
| 2,257,165 | 9/1941 | Fellmer | 260/145 C |
| 2,933,488 | 4/1960 | Biedermann et al. | 260/145 A |
| 3,787,387 | 1/1974 | Wicki | 260/145 A |
| 3,975,369 | 8/1976 | Wicki | 260/145 A |

FOREIGN PATENT DOCUMENTS 707225  6/1941  Fed. Rep. of Germany ...... 260/145

*Primary Examiner*—Floyd D. Higel
*Attorney, Agent, or Firm*—Edward McC. Roberts; Kevin T. Mansfield; Irving M. Fishman

[57] ABSTRACT

Dyes of the formula

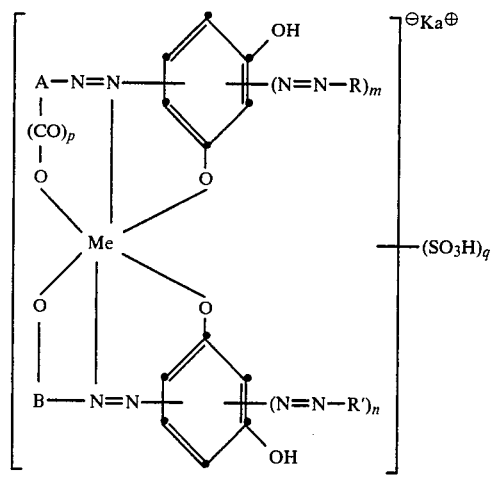

in which Me is cobalt or chromium, A is a diazo component of a benzene or naphthalene which carries a hydroxyl or carboxyl group in the o-position relative to the azo group, B is an o-aminonaphthol, R and R' independently of each other are each benzene or naphthalene which can carry further substituents, but no arylamino radicals, no sulfo groups and no metallizable groups, in the o-position relative to the azo group, Ka is a cation, p is 0 or 1, m and n independently of each other are each such a number from 0 to 1 that the total n+m is a number from 1 to 2, and q is an integer from 1 to 6 are particularly suitable for dyeing wool or polyamide and especially leather in shades of deep brown, grey and black.

These dyes exhibit good affinity, good acid and alkali stability, and good fastness.

7 Claims, No Drawings

1:2-METAL COMPLEX DYES CONTAINING ONE ATOM OF CHROMIUM OR COBALT AND TWO AZO DYES EACH FORMED BY COUPLING TWO DIAZO COMPOUNDS TO RESORCINOL

The present invention relates to metal complex dyes of the formula I

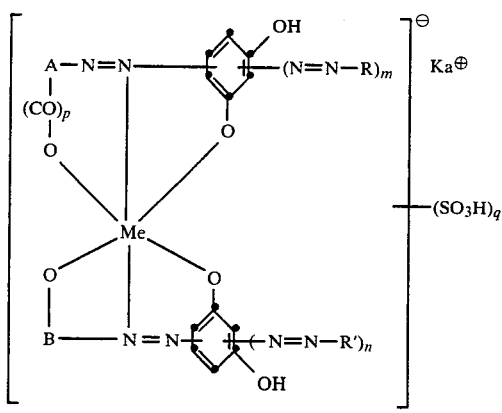

in which Me is cobalt or chromium, A is the radical of a diazo component of the benzene or naphthalene series which carries the hydroxyl or carboxyl group in o-position relative to the azo group, B is the radical of an o-aminonaphthol, R and R' independently of each other are each a benzene or naphthalene radical which can carry further substituents, but no arylamino radicals, no sulfo groups and no metallisable groups, in o-position relative to the azo group, Ka is a cation, p is 0 or 1, m and n independently of each other are each such a number from 0 to 1 that the total $n+m$ is a number from 1 to 2, and q is an integer from 1 to 6.

In the novel metal complex dyes of the above formula I, the radicals A, B, R and R' can carry further substituents customary in dyes, for example low molecular weight alkyl or alkoxy, halogen, for example chlorine or bromine, nitro, cyano, sulfo, carboxyl, phosphono, alkylsulfonyl, for example methylsulfonyl, sulfamides, for example sulfamide or sulfomethylamide, or acylamino. Low molecular weight alkyl or alkoxy groups are in this Application generally to be understood as meaning those which have 1 to 6, preferably 1 to 2, C atoms, and "acylamino" is the name given to low molecular weight alkanoylamino, alkylsulfonylamino and alkoxycarbonylamino radials and to sulfonylamino, aroylamino and arylsulfonylamino radicals.

The radical B preferably derives from the following amines: 1-amino-2-hydroxynaphthalene-4-sulfonic acid, 1-amino-2-hydroxy-6-nitronaphthalene-4-sulfonic acid, 1-amino-2hydroxy-6-chloronaphthalene-4-sulfonic acid, 1-amino-2-hydroxynaphthalene-4,6-disulfonic acid or 1-hydroxy-2-aminonaphthalene-4-sulfonic acid.

The radical A can derive from, for example, the amines mentioned above for the radical B as well as from, for example, the following ones: anthranilic acid, 4- or 5-chloroanthranilic acid, b 4- or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-aminobenzene-4-sulfoanthranilide, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid or 2-amino-1-hydroxybenzene-4,6-disulfonic acid.

A is preferably the radical of a 1-hydroxy-2-aminobenzene which is unsubstituted or can be monosubstituted or polysubstituted by halogen, nitro, sulfo, alkyl or alkoxy, or the radical of 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid or 1-hydroxy-2-aminonaphthalene-4-sulfonic acid.

In addition to the abovementioned, hydroxyl-containing amines, other amines to come into consideration for use as A and B are the corresponding methoxy compounds or corresponding compounds where the hydroxyl group has been tosylated, such as anisidine, 4- or 5-chloroanisidine, 4- or 5-nitroanisidine, anisidine-4- or -5-sulfonic acid, or tosylated 1-hydroxy-2-aminobenzene, the methoxy or O-tosyl group being converted into an OH group on metallisation. Compounds having these groups are used especially when the corresponding 1-hydroxy-2-amino compounds have poor coupling properties.

R and R' independently of each other are each a benzene or naphthalene radical and can carry substituents customary in diazo components, but no arylamino radicals, no sulfo groups and no metallisable groups in o-position relative to the azo group.

R and R' independently of each other are each preferably a phenyl radical which is unsubstituted or substituted by chlorine, bromine, nitro, sulfamide, N-monoalkylated or N,N-dialkylated sulfamide, alkylsulfonyl, alkyl or alkoxy, or a naphthyl radical.

Ka$^\oplus$ is preferably lithium, potassium or, in particular, sodium. Ka$^\oplus$ can also be an ammonium cation or the ammonium salt of an organic amine.

p is preferably 0, i.e. the diazo component A has a hydroxyl group in o-position relative to the azo group.

q is preferably 2, 3 or 4, and the sulfo groups are preferably located in the radicals A, B, R and R'.

Preferred dyes of the invention have the formula II

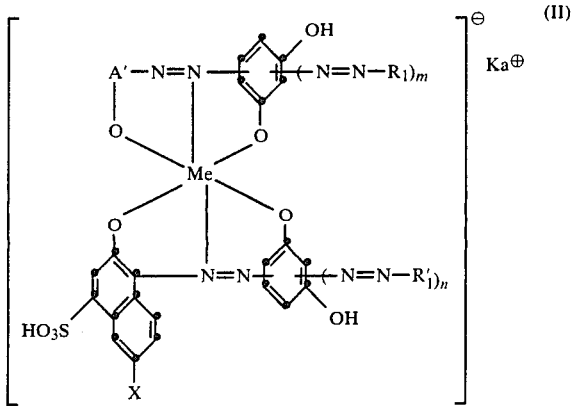

in which A' is a radical of a diazo component of the benzene or naphthalene series which carries the hydroxyl group in o-position relative to the azo group, $R_1$ and $R_1'$ independently of each other are each a phenyl radical which is unsubstituted or substituted by chlorine, bromine, nitro, sulfamide, N-monoalkylated or N,N-dialkylated sulfamide, alkylsulfonyl, alkyl or alkoxy, or a naphthyl radical, X is hydrogen, nitro, chlorine or sulfo, m and n independently of each other are each 1 to 2, Me is cobalt or chromium and $Ka^{\oplus}$ is a cation, and the dyes have a total of 2 to 6 sulfo groups.

The most preferred dyes are those which have the formula III

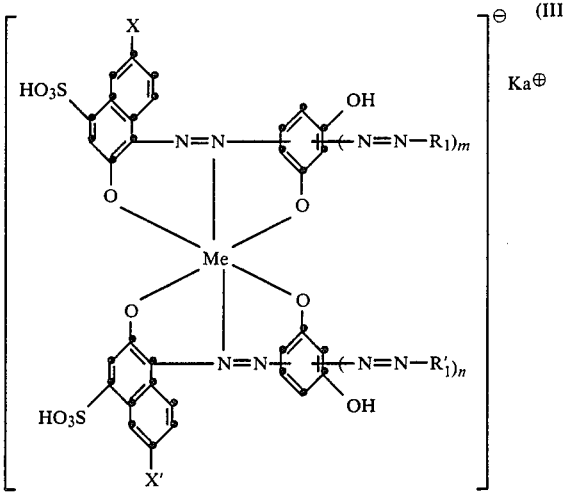

in which $R_1$ and $R_1'$ independently of each other are each a phenyl radical which is unsubstituted or substituted by chlorine, bromine, nitro, sulfamide, N-monoalkylated or N,N-dialkylated sulfamide, alkylsulfonyl, alkyl or alkoxy, or a naphthyl radical, X and X' independently of each other are hydrogen, nitro, chlorine or sulfo, m and n independently of each other are each 1 or 2, Me is cobalt or chromium and $Ka^{\oplus}$ is a cation, and the dyes have a total of 2 to 4 sulfo groups.

Of these dyes, those are particularly suitable for dyeing leather in which Me is chromium.

$R_1$ and $R_1'$ are each preferably a phenyl radical which is unsubstituted or monosubstituted or disubstituted by chlorine, $C_1$–$C_4$-alkyl or $C_1$–$C_4$-alkoxy, or a naphthyl radical.

The dyes of the invention can be prepared by methods known per se, for example by reacting a dye of the formula IV

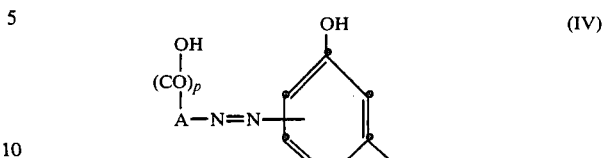

and a dye of the formula V

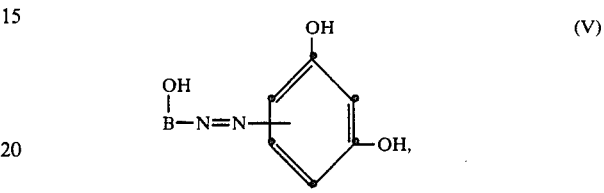

which two dyes IV and V can be identical, with a cobalt- or chromium-donating agent to give a 1:2 metal complex, the dye of the formula IV and/or the dye of the formula V having been coupled beforehand with, or the 1:2 complex formed to be coupled subsequently with, a diazonium compound of the formula VI

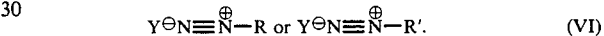

A, B, R, R' and p are as defined under the formula I, and $Y^{\ominus}$ is an anion, for example chloride.

It is also possible to use mixtures of 2 or more of the defined diazonium compounds.

If the dyes IV and V used in the above method are not identical, they give rise to mixtures of 1:2 metal complexes which, in addition to symmetrical complexes which contain 2 molecules of dye of the formula IV or V, also contain asymmetrical complexes which contain one molecule each of dye of the formula IV and V.

The 1:2 chromium complexes can also be prepared by preparing the 1:1 chromium complex of a dye of the formula IV or of a dye of the formula V, and then reacting this 1:1 complex with a non-metallised dye of the formula V or IV respectively to give a 1:2 chromium complex, the dye of the formula IV or V or the 1:1 complex of one of these dyes having been coupled beforehand with about one mol of, or the 1:2 complex formed to be subsequently coupled with about two mols of, a diazonium compound of the formula VI. In this way asymmetrical 1:2 chromium complexes can also be obtained as single compounds.

It is preferable first to prepare the 1:2 metal complex of the dyes IV and/or V and then to couple this complex with the diazonium compound of the formula VI.

The coupling reaction, the cobalting reaction and the chroming reaction are carried out by conventional methods.

The novel metal complex dyes obtainable by the above method are advantageously isolated in the form of their salts, in particular alkali metal salts, such as lithium, potassium or especially sodium salts, or ammonium salts. They are suitable for dyeing various natural or synthetic nitrogen- and hydroxyl-containing materials, such as polyamides or polyurethanes, but in particular for dyeing wool or especially leather.

Those metal complex dyes of the formula I which only have 2 sulfo groups can, if desired, also be isolated as amine salts, which are suitable for, for example, spraying leather and for colouring organic liquids, paints and polymers.

The novel dyes are tinctorially strong and have good covering properties. They have good affinity and good acid and alkali stability combined with good fastness properties, such as fastness to washing, water, perspiration, rubbing, diffusion, light, acid and alkali. Particularly noteworthy is their good build-up on various types of leather, not only on leather tanned with chromium salts but also on leather retanned with vegetable or synthetic tanning agents. Deep brown, grey and black shades are obtained.

In the examples, below, the parts and percentages are by weight, unless otherwise stated. The temperatures are given in degree centigrade.

In the examples, the azo bonds to the resorcinol are drawn as fixed in those cases where present knowledge allows the bonding position in the main product to be specified with some certainty. Nevertheless, the formulae shown are intended to embrace also the corresponding positional isomers, which are formed to a greater or lesser extent.

EXAMPLE 1

40.5 parts of the monoazo dye which can be obtained by a conventional method from 1-diazo-2-hydroxy-6-nitronaphthalene-4-sulfonic acid and 1,3-dihydroxybenzene are suspended in 500 parts of water at 70°, and the suspension is admixed with sufficient 2N sodium hydroxide solution to be brought to pH 7.5–8.0. 125 parts of a solution of sodium disalicylatochromate(III) which contains 3.07% by weight of $Cr_2O_3$ are added, and the reaction mixture is heated to the boil and then stirred under reflux until the metal-free starting dye is no longer detectable. The resulting, clear reddish violet solution of the 1:2 chromium complex is cooled down to 10°–15° and is slowly admixed, with further cooling in an ice-bath, with a conventionally prepared solution of the diazonium chloride of 12.75 parts of 4-chloro-1-aminobenzene, while pH 8–9 is maintained by adding dropwise a 4N solution of sodium carbonate at the same time.

The novel metal complex dye of the structure

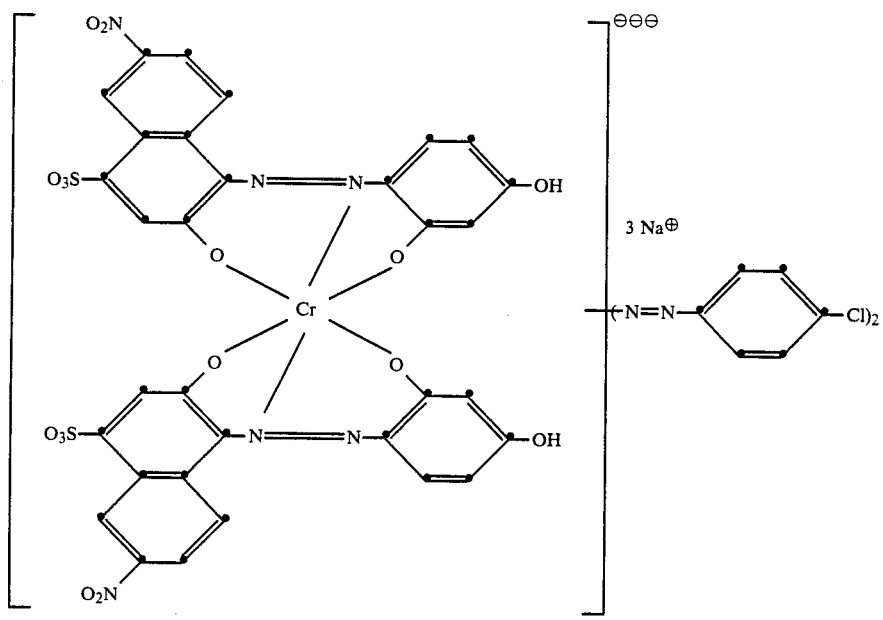

completely precipitates in the course of the coupling reaction; it is isolated by filtration, washed with dilute sodium chloride solution and then dried at 80° in vacuo. Grinding gives the dye in the form of a readily water-soluble black powder with which chromed leather and retanned leather can be dyed in very highly-covering fast brownish black shades.

If said monoazo dye is metallised at 70° to 80° and pH 8–9 with 14.1 parts of cobalt(II) sulfate heptahydrate in place of sodium disalicylatochromate, the subsequent coupling with diazotised 4-chloro-1-aminobenzene produces a similar dye of brownish violet shade.

The following table contains further dyes which can be prepared by the method described. Column I gives the 1,3-dihydroxybenzene monoazo dyes used, column II gives the metal used to form the complex, column III gives the diazo component, column IV gives the amount in which the diazo component was used (in number of mols per mol of monoazo dye) and, finally, column V gives the shades which can be obtained with the novel dyes on leather.

| No. | I Monoazo dye | II Metal | III Diazo component | IV Mols of diazo | V Shade |
|---|---|---|---|---|---|
| 1 | 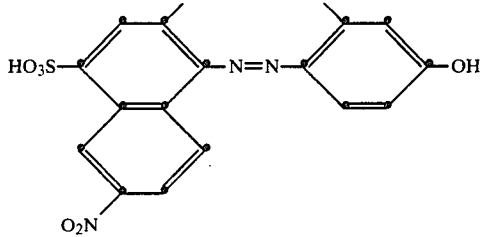 | Chromium | 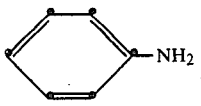 | 1 | reddish black |
| 2 | 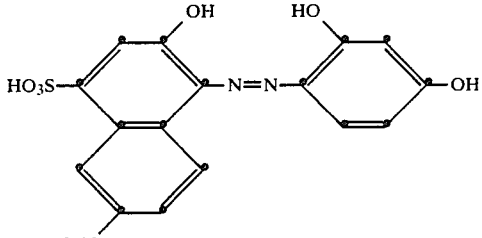 | Chromium |  | 1 | brownish black |
| 3 | 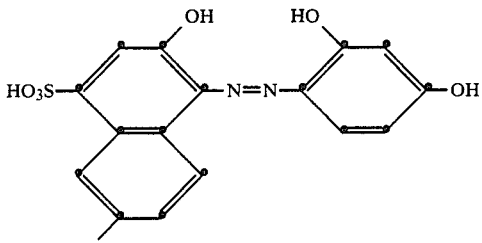 | Chromium | 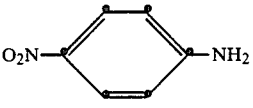 | 1 | brownish black |
| 4 | 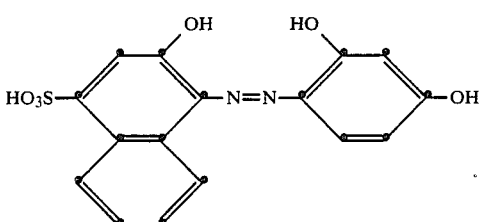 | Chromium | 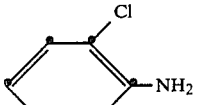 | 1 | violet-tinged black |
| 5 | 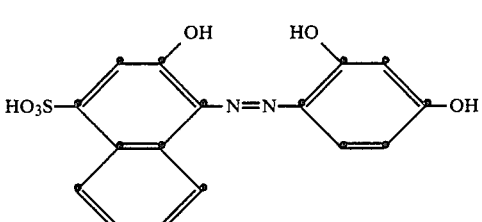 | Chromium | 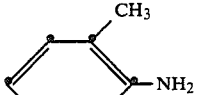 | 1 | brownish black |
| 6 | 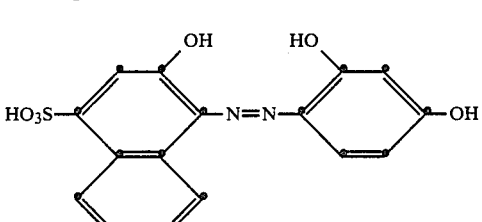 | Cobalt | 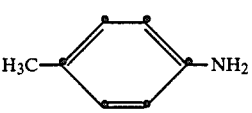 | 1 | brownish violet |

-continued

| No. | I Monoazo dye | II Metal | III Diazo component | IV Mols of diazo | V Shade |
|---|---|---|---|---|---|
| 7 | HO3S—[naphthalene with OH, NO2]—N=N—[benzene with HO, OH] | Chromium | H3C—[benzene]—NH2 | 1 | brownish violet |
| 8 | HO3S—[naphthalene with OH, NO2]—N=N—[benzene with HO, OH] | Chromium | [benzene with OCH3]—NH2 | 1 | violet-tinged brown |
| 9 | HO3S—[naphthalene with OH, NO2]—N=N—[benzene with HO, OH] | Chromium | H3CO—[benzene]—NH2 | 1 | violet-tinged brown |
| 10 | HO3S—[naphthalene with OH, NO2]—N=N—[benzene with HO, OH] | Chromium | [benzene with 2 Cl]—NH2 | 1 | brownish black |
| 11 | HO3S—[naphthalene with OH, NO2]—N=N—[benzene with HO, OH] | Chromium | [benzene with OCH3, Cl]—NH2 | 1 | reddish black |
| 12 | HO3S—[naphthalene with OH]—N=N—[benzene with HO, OH] | Chromium | [benzene]—NH2 | 1 | violet-tinged black |

-continued

| No. | I Monoazo dye | II Metal | III Diazo component | IV Mols of diazo | V Shade |
|-----|---------------|----------|---------------------|------------------|---------|
| 13 | HO₃S-naphthalene(OH)-N=N-phenyl(HO)(OH) | Chromium | 2-Cl-aniline (Cl ortho to NH₂) | 1 | reddish black |
| 14 | HO₃S-naphthalene(OH)-N=N-phenyl(HO)(OH) | Cobalt | 4-Cl-aniline | 1 | violet-tinged black |
| 15 | HO₃S-naphthalene(OH)-N=N-phenyl(HO)(OH) | Chromium | 4-O₂N-aniline | 1 | dark brown |
| 16 | HO₃S-naphthalene(OH)-N=N-phenyl(HO)(OH) | Chromium | 4-H₃C-aniline | 1 | dark brown |
| 17 | HO₃S-naphthalene(OH)-N=N-phenyl(HO)(OH) | Chromium | 4-H₃CO-aniline | 1 | reddish dark brown |
| 18 | HO₃S-naphthalene(OH)-N=N-phenyl(HO)(OH) | Chromium | 2,4-dichloroaniline | 1 | brownish black |
| 19 | HO₃S-naphthalene(OH)-N=N-phenyl(HO)(OH) | Chromium | 2-OCH₃-5-Cl-aniline | 1 | violet-tinged black |

-continued

| No. | I Monoazo dye | II Metal | III Diazo component | IV Mols of diazo | V Shade |
|---|---|---|---|---|---|
| 20 | [structure: naphthalene with OH, HO3S, NO2, N=N-phenyl with HO, OH] | Cobalt | [structure: H3CO-phenyl-NH2] | 1 | brownish violet |
| 21 | [structure: naphthalene with OH, HO3S, N=N-phenyl with HO, OH] | Cobalt | [structure: dichloroaniline with 2 Cl and NH2] | 1 | dark brown |
| 22 | [structure: naphthalene with OH, HO3S, Cl, N=N-phenyl with HO, OH] | Chromium | [structure: HO3S-phenyl-NH2] | 1 | brownish black |
| 23 | [structure: naphthalene with OH, HO3S, NO2, N=N-phenyl with HO, OH] | Chromium | [structure: naphthyl-NH2] | 1 | violet-tinged black |
| 24 | [structure: naphthalene with OH, HO3S, NO2, N=N-phenyl with HO, OH] | Cobalt | [structure: naphthyl-NH2] | 1 | dark brown |

EXAMPLE 2

40.5 parts of the monoazo dye which can be obtained by a known method from 1-diazo-2-hydroxy-6-nitronaphthalene-4-sulfonic acid and 1,3-dihydroxybenzene are suspended in 500 parts of water at 60°. The suspension is acidified to pH 2 with 30 parts of 2N sulfuric acid, is admixed with 22 parts of basic chromium(III) sulfate, is heated to the boil and is then stirred under reflux until the metal-free starting dye is no longer detectable.

When the mixture has cooled down to about 50°, the reddish violet 1:1 chromium complex of the monoazo dye, which has crystallised out, is isolated by filtration and washed with dilute sodium chloride solution until acid-free.

The filter paste of the 1:1 chromium complex is suspended in 500 parts of water at 70°, and the suspension is admixed with 36.0 parts of the known monoazo dye prepared from 1-diazo-2-hydroxynaphthalene-4-sulfonic acid and 1,3-dihydroxybenzene. The reaction mixture is brought to pH 7.0–7.5 by means of 2N sodium hydroxide solution, and is then stirred at this pH and a temperature of 90°–95° until the two starting dyes are no longer detectable.

The resulting, reddish violet solution of the one asymmetrical chromium complex is cooled down to about 10°-15° and is admixed a little at a time with a solution of benzenediazonium chloride prepared in a conventional manner from 18.6 parts of aminobenzene, while pH 8-9 is maintained by adding dropwise 2N sodium hydroxide solution at the same time. The novel dye has the structure leather and retanned leather in highly-covering fast brownish violet shades.

The following table lists further asymmetrical chromium complexes which can be obtained as single compounds by the method of the above example from the monoazo dyes of columns I and II, in which case one of the two dyes in the two columns being used in the form of a 1:1 chromium complex. Column III gives the diazo

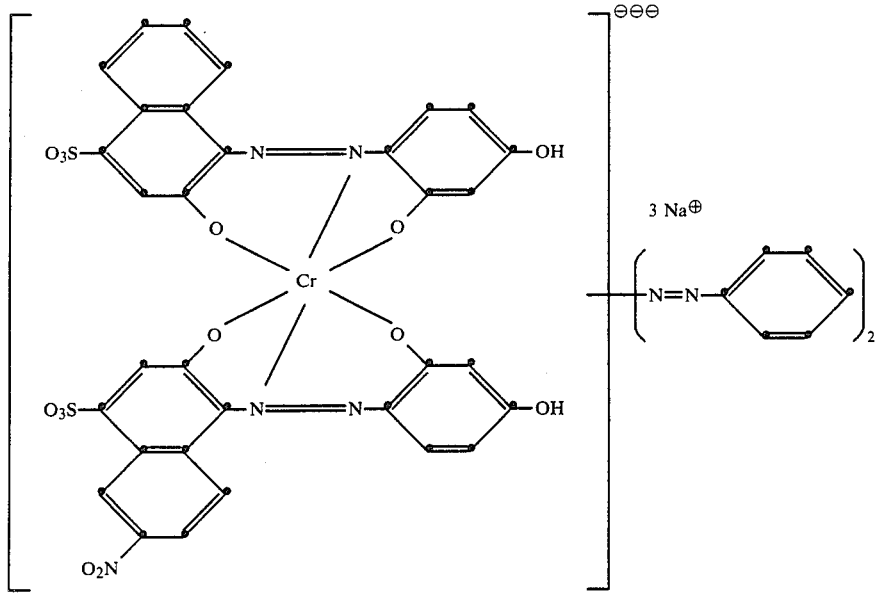

and is precipitated from the coupling mixture by adding sodium chloride, is isolated by filtration and is worked up in the manner of Example 1. The dye dyes chromed components used in the coupling and column IV gives the molar ratio of diazo components used to the mixed complex used. Column V gives the shades which can be obtained on leather.

| No. | I Monoazo dye I | II Monoazo dye 2 | III Diazo component | IV Mols of diazo component | V Shade |
|---|---|---|---|---|---|
| 1 | HO₃S—[naphthyl(OH)(O₂N)]—N=N—[phenyl(OH)(OH)] | HO₃S—[phenyl(OH)(NO₂)]—N=N—[phenyl(HO)(OH)] | Cl—[phenyl]—NH₂ | 2 | dark brown |
| 2 | HO₃S—[naphthyl(OH)(O₂N)]—N=N—[phenyl(OH)(OH)] | HO₃S—[phenyl(OH)(NO₂)]—N=N—[phenyl(HO)(OH)] | H₃CO—[phenyl]—NH₂ | 2 | violet-tinged brown |
| 3 | HO₃S—[naphthyl(OH)(O₂N)]—N=N—[phenyl(OH)(OH)] | O₂N—[phenyl(OH)(SO₃H)]—N=N—[phenyl(HO)(OH)] | Cl,Cl—[phenyl]—NH₂ | 2 | dark brown |

-continued

| No. | I Monoazo dye 1 | II Monoazo dye 2 | III Diazo component | IV Mols of diazo component | V Shade |
|---|---|---|---|---|---|
| 4 | 2,4-dihydroxy-... (HO₃S, O₂N on naphthol; OH, HO) —N=N— (OH, HO, OH) | O₂N, OH, SO₃H —N=N— OH, HO, OH | OCH₃, NH₂, Cl (aniline) | 2 | violet-tinged brown |
| 5 | HO₃S, O₂N naphthol —N=N— OH, HO, OH | HO₃S, Cl, OH —N=N— OH, HO, OH | O₂N—NH₂ | 2 | dark brown |
| 6 | HO₃S, O₂N naphthol —N=N— OH, HO, OH | HO₃S, OCH₃, OH —N=N— OH, HO, OH | Cl—NH₂ | 2 | dark brown |
| 7 | HO₃S naphthol —N=N— OH, HO, OH | HO₃S, NO₂, OH —N=N— OH, HO, OH | O₂N—NH₂ | 2 | dark brown |
| 8 | HO₃S naphthol —N=N— OH, HO, OH | HO₃S, Cl, OH —N=N— OH, HO, OH | OCH₃, NH₂, H₃CO | 2 | violet-tinged brown |
| 9 | HO₃S naphthol —N=N— OH, HO, OH | OH, SO₃H —N=N— OH, HO, OH | Cl, NH₂, Cl | 2 | brownish violet |
| 10 | HO₃S, O₂N naphthol —N=N— OH, HO, OH | OH, NO₂ —N=N— OH, HO, OH | NH₂ (aniline) | 2 | dark brown |
| 11 | HO₃S, O₂N naphthol —N=N— OH, HO, OH | OH, Cl —N=N— OH, HO, OH | H₃C—NH₂ | 2 | brownish violet |

| No. | I Monoazo dye 1 | II Monoazo dye 2 | III Diazo component | IV Mols of diazo component | V Shade |
|---|---|---|---|---|---|
| 12 | 2-hydroxy-1-(...)azo-2,4-dihydroxybenzene with HO₃S and O₂N substituents on naphthalene | 2-hydroxy-(...)azo-2,4-dihydroxybenzene with SO₂NH₂ substituent | Cl—C₆H₄—NH₂ | 2 | dark brown |
| 13 | HO₃S-naphthyl-azo-resorcinol | NO₂-phenyl-azo-resorcinol | H₃CO—C₆H₄—NH₂ | 2 | violet-tinged brown |
| 14 | HO₃S-naphthyl-azo-resorcinol | O₂N, NO₂-phenyl-azo-resorcinol | C₆H₅—NH₂ | 2 | brown |
| 15 | HO₃S, HO₃S-naphthyl-azo-resorcinol | O₂N, Cl-phenyl-azo-resorcinol | Cl—C₆H₄—NH₂ | 2 | dark brown |
| 16 | HO₃S, O₂N-naphthyl-azo-resorcinol | CH₃-phenyl-azo-resorcinol | naphthyl-NH₂ | 1 | dark brown |
| 17 | HO₃S-naphthyl-azo-resorcinol | HO₃S, NO₂-phenyl-azo-resorcinol | naphthyl-NH₂ | 1 | violet-tinged brown |

EXAMPLE 3

20.25 parts of the monoazo dye which can be obtained by a known method from 1-diazo-2-hydroxy-6-nitronaphthalene-4-sulfonic acid and 1,3-dihydroxybenzene, and 17.75 parts of the monoazo dye which can be obtained in a conventional manner from diazotised 4-nitro-2-aminophenol-6-sulfonic acid and 1,3-dihydroxybenzene are suspended together in 500 parts of water at 70°, and the suspension is brought to pH 7.5–8.0 by means of 2N sodium hydroxide solution. 125 parts of a solution of sodium disalicylatochromate(III) which contains 3.07% by weight of $Cr_2O_3$ are added, and the reaction mixture is heated to the boil and stirred under reflux until metal-free starting dyes are no longer detectable. The clear brown reaction solution contains a mixture of the two symmetrical 1:2 complexes with the one asymmetrical chromium complex of the two starting dyes.

The solution is cooled down to 10°–15°, and a conventionally prepared solution of the diazonium chloride of 10.7 parts of 4-methyl-1-aminobenzene is added dropwise while pH 8–9 is maintained. The novel dye obtained by evaporating the reaction solution of the completed coupling produces full violet-tinged brown shades on chromed leather and retanned leather.

If the mixture of the two starting dyes is metallised at 70°–80° C. and pH 8–8.5 with 14.1 parts of cobalt(II) sulfate heptahydrate in an otherwise identical manner, a coloristically similar, reddish brown mixed complex dye is formed.

The following table contains further dyes which can be prepared by the method of Example 3. Column I of the table gives the first monoazo dye, column II give the second monoazo dye and column III gives the molar ratio of these two starting materials. Column IV contains the metal used for forming the 1:2 complex, column V contains the diazo component, column VI contains the molar ratio of diazo component to total amount of resorcinol monoazo dyes used, and column VII contains the shades which can be obtained on leather.

| No. | I Monoazo dye I | II Monoazo dye II | III Molar I:II | IV Metal | V Diazo component | VI Mols of diazo component | VII Shade |
|---|---|---|---|---|---|---|---|
| 1 | naphthalene with OH, HO3S, O2N, N=N to phenyl with OH, OH | phenyl with HO, OH, HO3S, NO2, N=N to phenyl with OH, OH | 1:1 | Cr | 4-chloroaniline | 2 | dark brown |
| 2 | naphthalene with OH, HO3S, O2N, N=N to phenyl with OH, OH | phenyl with HO, OH, HO3S, Cl, N=N to phenyl with OH, OH | 2:1 | Co | 4-nitroaniline | 2 | violet-tinged brown |
| 3 | naphthalene with OH, HO3S, N=N to phenyl with OH, OH | phenyl with HO, OH, HO3S, Cl, N=N to phenyl with OH, OH | 1:1 | Cr | 4-methoxyaniline | 2 | brownish violet |
| 4 | naphthalene with OH, HO3S, N=N to phenyl with OH, OH | phenyl with HO, OH, HO3S, NO2, N=N to phenyl with OH, OH | 1:1 | Co | 2,5-dichloroaniline | 2 | dark brown |
| 5 | naphthalene with OH, HO3S, O2N, N=N to phenyl with OH, OH | phenyl with HO, OH, O2N, SO3H, N=N to phenyl with OH, OH | 2:1 | Cr | 1-naphthylamine | 2 | dark brown |

-continued

| No. | I Monoazo dye I | II Monoazo dye II | III Molar I:II | IV Metal | V Diazo component | VI Mols of diazo component | VII Shade |
|---|---|---|---|---|---|---|---|
| 6 | ![structure: naphthalene with OH, N=N linking to benzene with OH, OH, and HO3S substituent] | ![structure: benzene with OH, HO, N=N to benzene with OH, SO2NH2] | 1:1 | Co | ![structure: benzene with OCH3, NH2, H3CO] | 2 | brownish violet |
| 7 | ![structure: naphthalene with OH, HO, N=N to benzene, HO3S] | ![structure: benzene with OH, HO, N=N to benzene with OH, Cl, HO3S] | 2:1 | Co | ![naphthylamine with NH2] | 2 | violet |

EXAMPLE 4

40.5 parts of the monoazo dye which can be obtained by a known method from 1-diazo-2-hydroxy-6-nitronaphthalene-4-sulfonic acid and 1,3-dihydroxybenzene are converted into the corresponding 1:2 chromium complex by the method of Example 1.

The resulting, clear solution of the 1:2 chromium complex is cooled down to 10° to 15° and is slowly admixed with a simultaneously prepared solution of the diazonium compounds of 6.3 parts of 4-chloro-1-aminobenzene and 6.9 parts of 4-nitro-1-aminobenzene, while pH 8–9 is maintained by adding dropwise 2N sodium hydroxide solution at the same time.

The novel metal complex dye has the structure

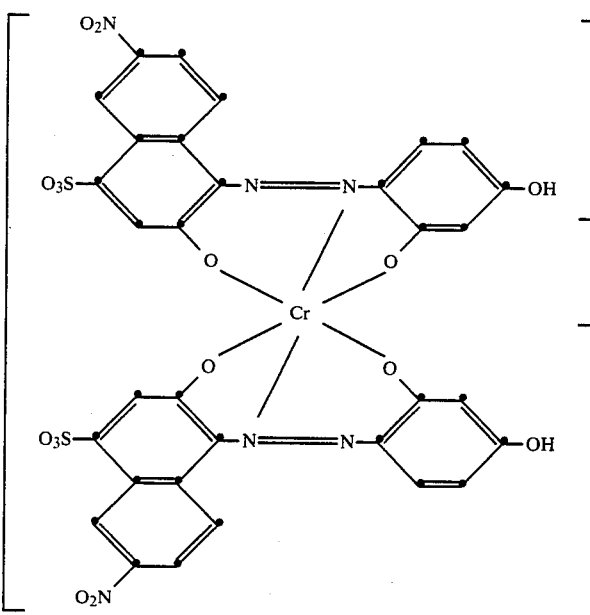

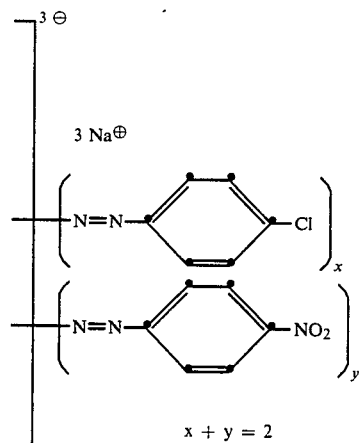

$x + y = 2$ and is worked up as in Example 1. It produces full fast brownish black dyeings on chromed leather and re-tanned leather.

EXAMPLE 5

A single, asymmetrical 1:2 chromium complex is prepared by the method of Example 2 from the two monoazo dyes prepared from 1-diazo-2-hydroxy-6-nitronaphthalene-4-sulfonic acid and 1,3-dihydroxybenzene and from 1-diazo-2-hydroxynaphthalene-4-sulfonic acid and 1,3-dihydroxybenzene. A coupling reaction with a mixture of the conventionally prepared diazonium compounds of 12.75 parts of 4-chloro-1-aminobenzene and 22.3 parts of 1-aminonaphthalene produces a random mixture of complex dyes.

An Example 1 working up produces a readily water-soluble dye with which fast black shades can be obtained on various grades of leather.

A method of dyeing leather 100 parts of clothing suede leather (dry weight) are wetted out at 50° in a solution of 1,000 parts by volume of water and 2 parts of 24% ammonia in the course of 2 hours, and are then dyed at 60° in a solution of 1,000 parts by volume of water, 2 parts of 24% ammonia and 6 parts of the dye of Example 1 for one hour. A solution of 40 parts by volume of water and 4 parts of 85% formic acid is then added, and the leather is dyed for a further 30 minutes. The pieces of leather are then thoroughly rinsed and can if desired be treated at 50° for 30 minutes with 2 parts of a dicyanodiamide-formaldehyde condensation product.

Other suede leathers and glove leather can be dyed in the same way.

The black dyeings thus obtained are distinguished by generally good fastness properties and very good covering properties.

What is claimed is:

1. A metal complex dye of the formula

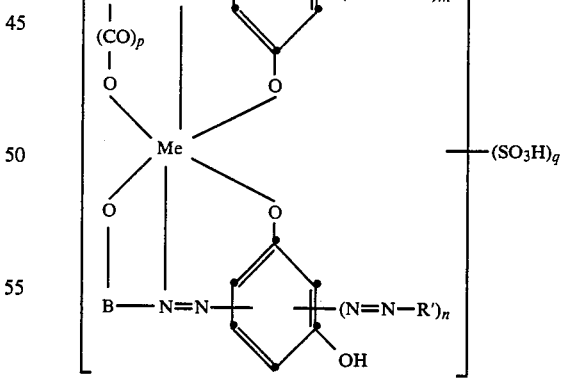

in which Me is cobalt or chromium, A is a diazo component of a benzene or naphthalene which carries a hydroxyl or carboxyl group in the o-position relative to the azo group, B is an o-aminonaphthol, R and R' independently of each other are each phenyl which is unsubstituted or substituted by chlorine, bromine, nitro, sulfamide, N-mono-alkylated or N,N-dialkylated sulfamide, alkylsulfonyl, alkyl or alkoxy, or naphthyl, Ka is a cation, p is 0 or 1, m and n independently of each other are each a number from 0 to 1 such that the total n+m is a number from 1 to 2, and q is an integer from 1 to 6.

2. A metal complex dye of claim 1, in which B is 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid or 1-hydroxy-2-aminonaphthalene-4-sulfonic acid.

3. A metal complex dye of claim 2, in which A is a 1-hydroxy-2-aminobenzene which is unsubstituted or monosubstituted or polysubstituted by halogen, nitro, sulfo, alkyl or alkoxy, or 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid or 1-hydroxy-2-aminonaphthalene-4-sulfonic acid.

4. A metal complex dye of the formula

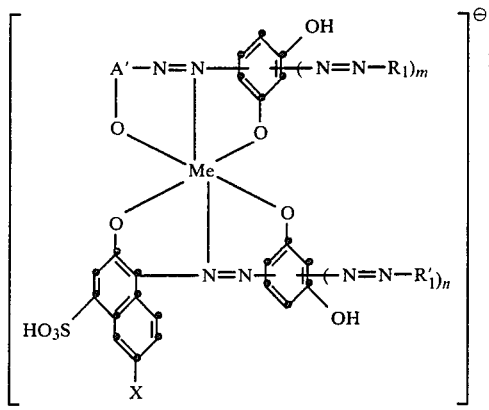

in which A' is a diazo component of the benzene or naphthalene series which carries the hydroxyl group in the o-position relative to the azo group, $R_1$ and $R_1'$ independently of each other are each phenyl which is unsubstituted or substituted by chlorine, bromine, nitro, sulfamide, N-monoalkylated or N,N-dialkylated sulfamide, alkylsulfonyl, alkyl or alkoxy, or naphthyl, X is hydrogen, nitro, chlorine or sulfo, m and n independently of each other are each 1 or 2, Me is cobalt or chromium and $Ka^\oplus$ is a cation, and the dyes have a total of 2 to 6 sulfo groups.

5. A metal complex dye of the formula

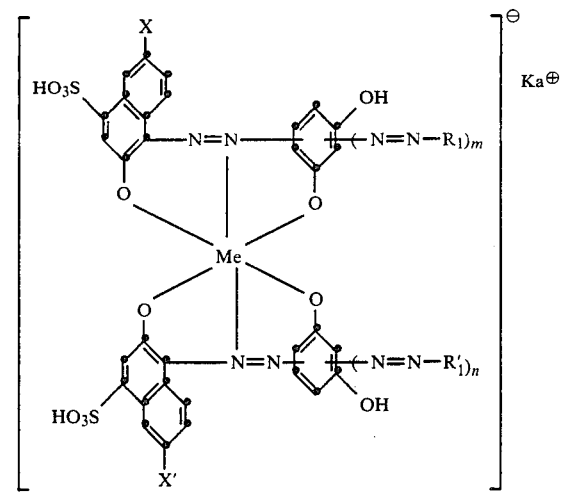

in which $R_1$ and $R_1'$ independently of each other are each phenyl which is unsubstituted or substituted by chlorine, bromine, nitro, sulfamide, N-monoalkylated or N,N-dialkylated sulfamide, alkylsulfonyl, alkyl or alkoxy, or a naphthyl radical, X and X' independently of each other are hydrogen, nitro, chlorine or sulfo, m and n independently of each other are each 1 or 2, Me is cobalt or chromium and $Ka^\oplus$ is a cation, and the dyes have a total of 2 to 4 sulfo groups.

6. A metal complex dye of claim 5, in which Me is chromium.

7. A metal complex dye of claim 6, in which $R_1$ and $R_1'$ are each phenyl which is unsubstituted or monosubstituted or disubstituted by chlorine, $C_1$-$C_4$-alkyl or $C_1$-$C_4$-alkoxy, or naphthyl.

* * * * *